(12) United States Patent
Tokuda et al.

(10) Patent No.: US 6,809,889 B2
(45) Date of Patent: Oct. 26, 2004

(54) RADIATION CURABLE RESIN COMPOSITION FOR FRESNEL LENS AND FRESNEL LENS SHEET

(75) Inventors: Hiroyuki Tokuda, Sakura (JP); Yasunobu Hirota, Chiba (JP); Yasuhiro Doi, Mihara (JP)

(73) Assignees: Dainippon Ink and Chemicals, Inc., Tokyo (JP); Dai Nippon Printing Co., Ltd., Tokyo (JP)

( * ) Notice: Subject to any disclaimer, the term of this patent is extended or adjusted under 35 U.S.C. 154(b) by 15 days.

(21) Appl. No.: 10/270,568

(22) Filed: Oct. 16, 2002

(65) Prior Publication Data

US 2003/0113544 A1 Jun. 19, 2003

(30) Foreign Application Priority Data

Oct. 23, 2001 (JP) .................................... P2001-325425

(51) Int. Cl.$^7$ ................................................ G02B 3/08
(52) U.S. Cl. ........................ 359/742; 525/530; 525/533; 526/263; 526/320; 526/321; 526/328.5; 526/334
(58) Field of Search ........................ 359/742; 525/530, 525/533; 526/263, 320, 321, 328.5, 334

(56) References Cited

U.S. PATENT DOCUMENTS 6,288,136 B1    9/2001   Ukon et al.
6,335,079 B1 *  1/2002   Osawa et al. ................ 428/141

FOREIGN PATENT DOCUMENTS

| EP | 0759448 A1 | 2/1997 |
|---|---|---|
| JP | 3-157412 | 7/1991 |
| JP | 5-287040 | 11/1993 |
| JP | 05-287040 | 11/1993 |
| JP | 09-235338 | 9/1997 |
| JP | 11-60656 | 3/1999 |
| JP | 1152317 | * 6/1999 |
| JP | 11-152317 | 6/1999 |
| JP | 11-171941 | 6/1999 |
| JP | 11-240926 | 9/1999 |

OTHER PUBLICATIONS

Derwent Abstract of JP'317.*
European Search Report dated Nov. 4, 2003.

* cited by examiner

*Primary Examiner*—Philip Tucker
*Assistant Examiner*—D. Aylward
(74) *Attorney, Agent, or Firm*—Armstrong, Kratz, Quintos, Hanson & Brooks, LLP

(57) ABSTRACT

A radiation curable resin composition for a Fresnel lens is provided, which exhibits a high elastic modulus and a high refractive index and is superior in adhesion to the plastic substrate and is superior in transparency. A lens layer exhibits excellent shape retention over a wide temperature range and is less likely to chip and crack due to an external force. A Fresnel lens sheet using the radiation curable resin composition is also provided. The resin composition comprises, as an essential component, an epoxy (meth) acrylate (a) having an epoxy equivalent per weight of 450 g/eq or more, which has a cyclic structure and two or more (meth)acryloyl groups; a specific trifunctional (meth) acrylate (b); a (meth)acrylate (c) having a molecular weight of 700 or less from an aliphatic polyhydric alcohol having an oxypropylene structure; and a monofunctional (meth) acrylate (d) having a cyclic structure.

5 Claims, 1 Drawing Sheet

RADIATION CURABLE RESIN COMPOSITION FOR FRESNEL LENS AND FRESNEL LENS SHEET

BACKGROUND OF THE INVENTION

1. Field of the Invention

The present invention relates to a radiation curable resin composition, which is used for the purpose of obtaining desired diffusion angle, luminance in emission direction, and luminance in peak direction of output light using light from a light source, and which is suitable for production of optical components such as a Fresnel lens sheet having a structure in which a molded layer having a lens function made of a cured resin article, for example, a Fresnel lens layer is formed on a plate- or sheet-shaped plastic substrate, and relates to a Fresnel lens sheet obtained by curing the resin composition coated on the surface of the substrate. Also the present invention relates to a radiation curable resin composition for a Fresnel lens, which exhibits a high elastic modulus and a high refractive index and is superior in adhesion to the plastic substrate and in transparency, wherein a lens layer exhibits excellent shape retention over a wide temperature range and is less likely to chip and crack due to external force, and to a Fresnel lens sheet provided with a Fresnel lens layer made of the radiation curable resin composition.

2. Description of Related Art

As a transmission type screen used in projection TV sets, for example, there has hitherto been known a screen with a configuration in which a Fresnel lens sheet, which converts diffused light from a light source such as a CRT into parallel light beams and transfers the parallel light beams to the user, is used in combination with a lenticular lens sheet which has an effect of distributing light towards only the viewing angle of the user so as to effectively utilize a fixed quantity of light.

As the method of molding a Fresnel lens sheet, there has recently been proposed a method of forming a Fresnel lens layer on a plastic substrate using a radiation curable resin composition and efficiently forming a Fresnel lens sheet only by irradiation with radiation such as ultraviolet light within a short time.

There has been reported an example wherein an epoxy (meth)acrylate resin composition, which exhibits a high elastic modulus and a high refractive index, is used as a radiation curable resin composition to be used in the Fresnel lens layer. However, since the Fresnel lens sheet is sometimes locally deformed by an external force during the manufacturing process or when assembled in an apparatus, the brittleness of the Fresnel lens layer is not sufficiently improved when using an epoxy (meth)acrylate resin composition having a high elastic modulus. For example, there were problems in that chipping, cracking and breakage occurred when a shock is given to a fine shape formed on the Fresnel lens sheet or when the sheet is cut into a desired size.

Furthermore, it has recently been required that the Fresnel lens sheet be superior in adhesion to the transparent plastic substrate to be used as a substrate and also have a good shape retention over a wide temperature range including a high temperature range because the Fresnel lens sheet is used in various environments.

To cope with these required characteristics, Japanese Unexamined Patent Application, First Publication No. Hei 5-287040, Japanese Unexamined Patent Application, First Publication No. Hei 11-60656, Japanese Unexamined Patent Application, First Publication No. Hei 11-171941, and Japanese Unexamined Patent Application, First Publication No. Hei 11-240926 disclose that the hardness, heat resistance and durability can be improved by using an epoxy (meth) acrylate resin composition which exhibits characteristics of a cured article having a high elastic modulus.

Also Japanese Unexamined Patent Application, First Publication No. Hei 11-152317 discloses a composition for a plastic lens having a high elastic modulus, wherein the heat resistance, impact resistance, and dyeability have been improved by using an epoxy (meth)acrylate resin composition containing polybutylene glycol di(meth)acrylate as an essential component.

Also Japanese Unexamined Patent Application, First Publication No. Hei 3-157412 reports an ultraviolet light curable resin composition for a transmission type screen, comprising, as an essential component, a (meth)acrylate having a polyethylene glycol or polypropylene glycol segment containing dissolved alkali earth metal salt or protonic acid therein, and also discloses, as an example, a resin composition having an antistatic function, which is less likely to cause adhesion of dust, prepared by using a resin composition containing epoxy (meth)acrylate.

However, when the Fresnel lens sheet is actually produced in accordance with the method described in Japanese Unexamined Patent Application, First Publication No. Hei 5-287040, Japanese Unexamined Patent Application, First Publication No. Hei 11-60656, Japanese Unexamined Patent Application, First Publication No. Hei 11-171941 or Japanese Unexamined Patent Application, First Publication No. Hei 11-240926, these methods of the prior art hardly reconcile the prevention of chipping and cracks caused by an external force and shape retention over a wide temperature range, although the resulting cured article is superior in hardness and refractive index.

Also the composition for plastic lens described in Japanese Unexamined Patent Application, First Publication No. Hei 11-152317 is a resin composition cured by irradiation with radiation after pouring into a mirror-polished plastic or glass mold, and the cured article must be removed from the mold after curing. In this case, there is no required adhesion to the transparent plastic substrate, which is required when the Fresnel lens sheet is actually produced, and therefore no study of an improvement in adhesion was made.

Also Japanese Unexamined Patent Application, First Publication No. Hei 3-157412 broadly describes compositions of resin composition for a Fresnel lens and concretely discloses an example of a cured article layer having relatively low elastic modulus, but does not disclose a composition which reconciles the prevention of chipping and cracks caused by an external force and shape retention over a wide temperature range in the case in which a high elastic modulus is imparted to the cured article.

BRIEF SUMMARY OF THE INVENTION

An object to be achieved by the present invention is to provide a radiation curable resin composition for a Fresnel lens, which exhibits a high elastic modulus and a high refractive index and is superior in adhesion to the plastic substrate and superior in transparency, wherein a lens layer exhibits excellent shape retention over a wide temperature range and is less likely to cause chipping and cracks due to an outer force, and to a Fresnel lens sheet using the radiation curable resin composition.

The present inventors have intensively researched in order to meet the required characteristics described above and discovered the following. That is, it is made possible to obtain a radiation curable resin composition for a Fresnel lens, which has excellent adhesion to the plastic substrate and is less likely to cause chipping and cracks due to an outer force while maintaining a high elastic modulus, and also exhibits excellent shape retention over a wide temperature range, and a Fresnel lens sheet using the radiation curable resin composition, by using, in an epoxy (meth)acrylate resin composition, which exhibits a high elastic modulus and a high refractive index, an epoxy (meth)acrylate (a), a compound (b) of the general formula (1) described hereinafter, being selected as a specific trifunctional (meth) acrylate capable of imparting good shape retention and processability, and a (meth)acrylate (c) having a molecular weight of 700 or less, at which a high elastic modulus imparted by epoxy (meth)acrylate is not impaired, and an oxypropylene structure, and a monofunctional (meth) acrylate (d) having a specific structure in combination. Thus, the present invention has been completed.

The present invention provides a radiation curable resin composition for a Fresnel lens comprising, as an essential component, an epoxy (meth)acrylate (a) having two or more (meth)acryloyl groups obtained by reacting an epoxy resin having a cyclic structure and an epoxy equivalent per weight of 450 g/eq or more with (meth)acrylic acid; a trifunctional (meth)acrylate (b) represented by the following general formula (1); a (meth)acrylate (c) which is (meth)acrylate of an aliphatic polyhydric alcohol having a molecular weight of 700 or less and having an oxypropylene structure and two or more hydroxyl groups; and a monofunctional (meth)acrylate (d) having a cyclic structure:

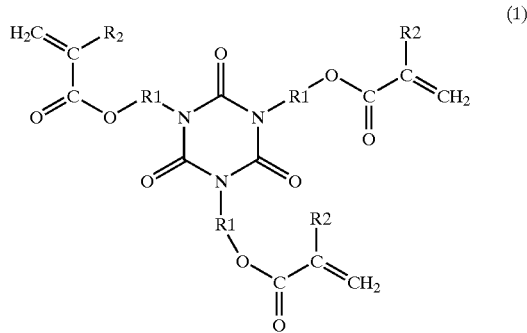

(1)

wherein R1 represents a hydrocarbon group having 1 to 5 carbon atoms and R2 represents hydrogen or a methyl group.

Also the present invention provides a Fresnel lens sheet comprising a substrate made of a (meth)acrylic resin containing methyl methacrylate as a main component, a polystyrene resin or a polycarbonate resin, and a resin layer made of a cured article of the above radiation curable resin composition for a Fresnel lens of the present invention, which is formed on the surface of the substrate in the form of a Fresnel lens.

The cured article obtained from the radiation curable resin composition for a Fresnel lens of the present invention exhibits a high elastic modulus and a high refractive index and is superior in adhesion to the plastic substrate and transparency, wherein a lens layer exhibits excellent shape retention over a wide temperature range and is less likely to cause chipping and cracks due to an outer force.

Therefore, when a screen is made using the cured article, the resistance to the contact pressure with a lenticular lens and the resistance to the pressure due to assembly after TV unit setting are improved, thus simplifying the design with resect to handling during screen setting, for example, operability and assembly. Also it is possible to cope with the design of a lens having a shorter focus because of a high refractive index.

DETAILED DESCRIPTION OF THE INVENTION

Figure 1:
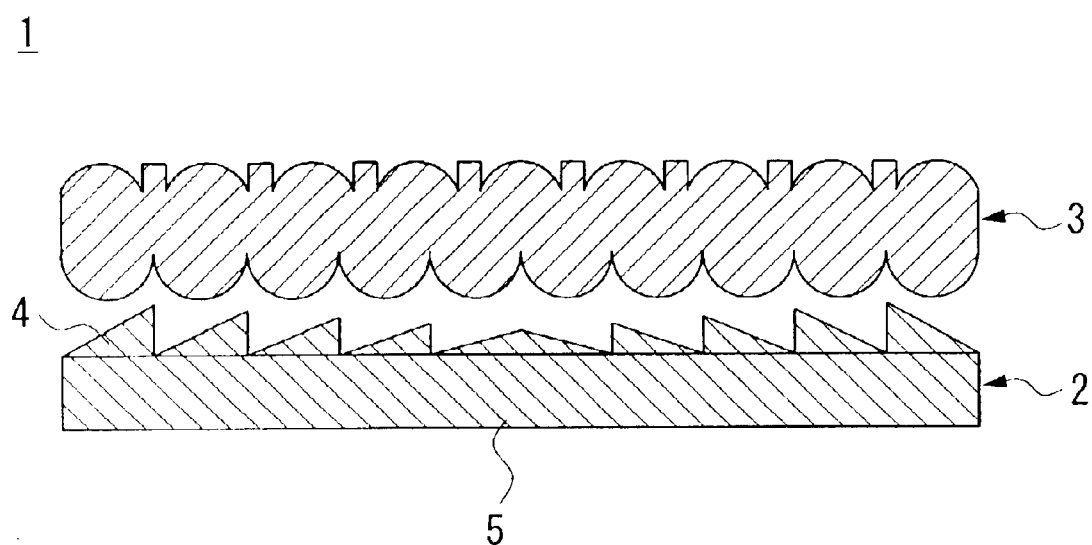
FIG. 1 is a cross-sectional view showing a screen using a Fresnel lens sheet.

The present invention will now be described in detail.

To improve the brittleness of the Fresnel lens layer and to generate a high elastic modulus and a high refractive index, an epoxy (meth)acrylate (a) having two or more (meth) acryloyl groups obtained by reacting an epoxy resin having a cyclic structure and an epoxy equivalent per weight of 450 g/eq or more with (meth)acrylic acid is used as the epoxy (meth)acrylate (a) in the present invention.

The epoxy resin having a cyclic structure and an epoxy equivalent per weight of 450 g/eq or more may be an epoxy resin which has an oxirane ring constituting the epoxy group and a cyclic structure other than the oxirane ring, and also has an epoxy equivalent weight of 450 g/eq or more. Examples thereof include bisphenol type epoxy resin such as bisphenol A type epoxy resin, bisphenol F type epoxy resin, halogen-substituted bisphenol A type epoxy resin, halogen-substituted bisphenol F type epoxy resin or hydrogenated bisphenol A type epoxy resin, novolak type epoxy resin such as phenol novolak type epoxy resin or cresol novolak type epoxy resin, and naphthalene type epoxy resin, each having an epoxy equivalent weight of 450 g/eq or more.

Examples of the epoxy (meth)acrylate (a) obtained by reacting the epoxy resin with (meth)acrylic acid include bisphenol type epoxy (meth)acrylate, novolak type epoxy (meth)acrylate, naphthalene type epoxy (meth)acrylate, and mixtures thereof. Among these epoxy (meth)acrylates, bisphenol type epoxy (meth)acrylate is preferred and bisphenol A type epoxy (meth)acrylate is particularly preferred in view of the pliability and high refractive index of the cured article.

To obtain an epoxy resin having an epoxy equivalent per weight of 450 g/eq or more, an epoxy resin having an epoxy equivalent per weight of 450 g/eq or more may be used alone. Alternatively, the average epoxy equivalent weight may be adjusted to 450 g/eq or more by using epoxy resins having different epoxy equivalents per weight in combination. The epoxy equivalent per weight of the epoxy resin used in the present invention is preferably within a range from 450 to 1000 g/eq.

In the present invention, different epoxy (meth)acrylates may be used in combination as the epoxy (meth)acrylate (a) as long as the average epoxy equivalent per weight is 450 g/eq or more when calculated in terms of the epoxy resin as a starting material.

The radiation curable resin composition for a Fresnel lens of the present invention contains, as a component other than the compound (a), a trifunctional (meth)acrylate (b) represented by the above general formula (1), a (meth)acrylate (c) which is (meth)acrylate of an aliphatic polyhydric alcohol having an oxypropylene structure and two or more hydroxyl groups and has a molecular weight of 700 or less, and a monofunctional (meth)acrylate (d) having a cyclic structure.

The hardness and mechanical properties of the radiation curable resin are generally influenced by the toughness and crosslinked density of the resin structure. In the case of a resin composition which exhibits characteristics of the cured article having a high elastic modulus, the glass transition temperature of the cured resin article often becomes higher than the ambient temperature. Since the crosslinked density of the cured resin article varies depending on the conversion of a crosslinking functional group, it is insufficient to research only the concentration of the crosslinking functional group in the resin composition and the elastic modulus at about room temperature of the cured article cured by irradiation with radiation and the crosslinked structure observed from dynamic mechanical properties of the cured article cured by irradiation with radiation.

In the epoxy (meth)acrylate resin composition of the present invention, which exhibits characteristics of the cured article having a high elastic modulus, it becomes easy to generate preferred values in the measurement of the dynamic viscoelasticity by not only imparting individual characteristics of the components (b), (c) and (d) in the composition, but also using the components (b), (c) and (d) in combination, thus obtaining a Fresnel lens sheet which is less likely to chip and crack due to an external force even if the Fresnel lens layer exhibits a high elastic modulus, and also is superior in adhesion and shape retention over a wide temperature range.

The trifunctional (meth)acrylate (b) represented by the general formula (1) used in the present invention imparts good shape retention over a high temperature range to the radiation curable resin composition for a Fresnel lens of the present invention and also imparts good pliability and excellent resistance to chipping and cracks caused by an external force applied in the manufacturing process to the cured article within normal temperature range, regardless of a high elastic modulus.

Typical examples of the trifunctional (meth)acrylate (b) include tri(meth)acrylate of tris(2-hydroxyethyl)isocyanuric acid.

As the trifunctional (meth)acrylate (b), for example, commercially available products such as Fancryl FA-731A (Hitachi Chemical Co., Ltd.), Aronix M-315 (Toagosei Co., Ltd.), SR-368 (KAYAKU-SARTOMER CO., LTD.) and New Frontier TEICA (Dai-ichi Kogyo Seiyaku Co., Ltd.) can be used.

In the present invention, as the (meth)acrylate (c), a (meth)acrylate of an aliphatic polyhydric alcohol, which has an oxypropylene structure and two or more hydroxyl groups and also has a molecular weight of 700 or less is used in order to improve the adhesion to the plastic substrate without impairing a high elastic modulus imparted by the epoxy (meth)acrylate (a).

Typical examples of the (meth)acrylate (c) include propylene glycol di(meth)acrylate, dipropylene glycol di(meth)acrylate, tripropylene glycol di(meth)acrylate, tetrapropylene glycol di(meth)acrylate, pentapropylene glycol di(meth)acrylate, hexapropylene glycol di(meth)acrylate, heptapropylene glycol di(meth)acrylate, octapropylene glycol di(meth)acrylate and nonapropylene glycol di(meth)acrylate.

Other typical examples of the (meth)acrylate (c) include compounds obtained by ester bonding of three or more molecules of (meth)acrylic acid to compounds having three or more hydroxyl groups, such as hydroxyl group-containing compound obtained by adding 1 to 6 mol of oxypropylene to trimethylolpropane and hydroxyl group-containing compound obtained by adding 1 to 4 mol of oxypropylene to pentaerythritol.

These compounds can be used alone or in combination.

When the (meth)acrylate (c) used in the present invention has a molecular weight of more than 700, the elastic modulus and glass transition temperature of the cured article are lowered because a high-molecular weight polypropylene glycol chain, which exhibits a low elastic modulus, is contained, thus preventing generation of characteristics of the cured article having a high elastic modulus peculiar to the epoxy (meth)acrylate resin composition and lowering the shape retention of the Fresnel lens layer. The shape retention over a high temperature range is drastically lowered.

Furthermore the (meth)acrylate (c) used in the present invention preferably has a molecular weight within a range from 180 to 450. Typical examples thereof include propylene glycol di(meth)acrylate, dipropylene glycol di(meth) acrylate, tripropylene glycol di(meth)acrylate, tetrapropylene glycol di(meth)acrylate and pentapropylene glycol di(meth)acrylate.

In the present invention, as the monofunctional (meth) acrylate (d), a monofunctional (meth)acrylate having a cyclic structure is used in order to generate a high refractive index without impairing a high elastic modulus.

Typical examples of the monofunctional (meth)acrylate (d) include benzoyioxyethyl (meth)acrylate, benzyl (meth) acrylate, phenylethyl (meth)acrylate, phenoxyethyl (meth) acrylate, phenoxy diethylene glycol (meth)acrylate, 2-hydroxy-3-phenoxypropyl (meth)acrylate and 2-phenyl-2-(4-acryloyloxyphenyl)propane; 2-phenyl-2-(4-(meth) acryloyloxyphenyl)propane, 2-phenyl-2-(4-(meth) acryloyloxyethoxyphenyl)propane and 2-phenyl-2-(4-(me by the following general formula (2):

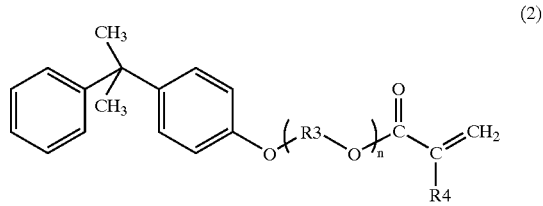

wherein R3 represents a hydrocarbon group having 1 to 5 carbon atoms, R4 represents hydrogen or a methyl group, and n represents an integer of 0 to 3;

monofunctional (meth)acrylates having an aromatic ring, such as chlorophenyl (meth)acrylate, bromophenyl (meth)acrylate, chlorobenzyl (meth)acrylate, bromobenzyl (meth)acrylate, chlorophenylethyl (meth) acrylate, bromophenylethyl (meth)acrylate, chlorophenoxyethyl (meth)acrylate, bromophenoxyethyl (meth) acrylate, 2,4,6-trichlorophenyl (meth)acrylate, 2,4,6-tribromophenyl (meth)acrylate, 2,4,6-trichlorobenzyl (meth)acrylate, 2,4,6-tribromobenzyl (meth)acrylate, 2,4,6-trichlorophenoxyethyl (meth)acrylate, 2,4,6-tribromophenoxyethyl (meth)acrylate, o-phenylphenol (poly)ethoxy (meth)acrylate and p-phenylphenol(poly) ethoxy(meth)acrylate; and (meth)acrylates having an alicyclic alkyl group, such as cyclohexyl (meth)acrylate, isobornyl (meth)acrylate, dicyclopentanyl (meth)acrylate, dicyclopentenyloxyethyl (meth)acrylate, tetrahydrofurfuryl (meth)acrylate and glycidyl cyclocarbonate (meth)acrylate.

Among these compounds, monofunctional (meth) acrylates having an aromatic ring, such as benzyl (meth) acrylate, phenoxyethyl (meth)acrylate, phenoxy diethylene glycol (meth)acrylate, 2-hydroxy-3-phenoxypropyl (meth) acrylate, 2-phenyl-2-(4-acryloyloxyphenyl)propane, 2-phenyl-2-(4-(meth)acryloyloxyethoxyphenyl)propane, 2,4,6-tribromophenyl (meth)acrylate, 2,4,6-tribromophenoxyethyl (meth)acrylate, o-phenylphenol (poly)ethoxy (meth)acrylate and p-phenylphenol(poly) ethoxy (meth)acrylate are preferably used because they do not impair a high elastic modulus and a high refractive index imparted by the epoxy (meth)acrylate composition used in the present invention.

The radiation curable resin composition for a Fresnel lens of the present invention contains 30 to 70 parts by weight of the component (a), 1 to 20 parts by weight of the component (b), 5 to 40 parts by weight of the component (c) and 5 to 35 parts by weight of component (d), each amount being based on 100 parts by weight of the total amount of these components (a), (b), (c) and (d) in the resin composition.

When the amount of the component (a) is within a range from 30 to 70 parts by weight, characteristics of the cured article having a high refractive index and a high elastic modulus peculiar to the epoxy (meth)acrylate resin composition are generated and the Fresnel lens layer does not become brittle and, therefore, chipping and cracks do not occur. When the amount of the component (b) is within a range from 1 to 20 parts by weight, good shape retention over a high temperature range can be imparted to the Fresnel lens layer without lowering the pliability imparted by an increase in elastic modulus and the resistance to chipping and cracks caused by an external force. Furthermore, when the amount of the component (c) is within a range from 5 to 40 parts by weight, the adhesion to the plastic substrate can be imparted without deteriorating the shape retention of the Fresnel lens layer due to a reduction in elastic modulus. Furthermore, when the amount of the component (d) is within a range from 5 to 35 parts by weight, the effect of improving the brittleness of the Fresnel lens layer can be expected without preventing generation of characteristics of the cured article having a high elastic modulus peculiar to the epoxy (meth)acrylate resin composition, and also the resin composition exhibits proper viscosity, thus making it possible to uniformly coat the resin composition to a matrix and to duplicate a matrix having a fine structure.

Regarding the radiation curable resin composition for a Fresnel lens of the present invention, which exhibits a high elastic modulus, the cured article cured by irradiation with radiation preferably has a tensile elastic modulus within a range from 1200 to 1900 MPa at 23° C.

When the tensile elastic modulus is within a range from 1200 to 1900 MPa, the cured article is superior in balance between characteristics of the cured article having a high elastic modulus, peculiar to the epoxy (meth)acrylate resin composition, and the resistance to chipping and cracks caused by an external force.

Regarding the radiation curable resin composition for a Fresnel lens of the present invention, it becomes easy to generate preferred values in the measurement of the dynamic viscoelasticity by using the epoxy (meth)acrylate (a) in combination with the components (b), (c) and (d) within the above composition range, thus obtaining a Fresnel lens sheet which is less likely to cause chipping and cracks due to an external force even if the Fresnel lens layer exhibits a high elastic modulus, and is also superior in adhesion to the substrate and shape retention over a wide temperature range.

In the radiation curable resin composition for a Fresnel lens of the present invention, a temperature, at which tan δ (tangent of the loss angle) as determined in the measurement of a dynamic viscoelasticity at a frequency of 1 Hz of the cured article cured by irradiation with radiation exhibits a maximum value, [T (max)], is preferably 50° C. or higher, a maximum value of tan δ, [Tan δ (max)], is preferably within a range from 0.7 to 2.0, and a difference in temperature between two points where tan δ exhibits a value of 0.1, [ΔT (0.1)], is preferably 60° C. or lower.

[T (max)] of 50° C. or higher can improve the shape retention over a high temperature range and, furthermore, (i) [Tan δ (max)] ranging from 0.7 to 2.0 and (ii) [ΔT(0.1)] of 60° C. or lower, namely, a sharp tan delta distribution can prevent the reduction of the elastic modulus of the cured article, which can cause thermal deformation, to the vicinity of the high temperature range represented by [Tan δ (max)] while maintaining the toughness.

Also in the case in which [Tan δ (max)] is higher than 2.0, sharp tan delta distribution is obtained; however, it becomes necessary to reduce the elastic modulus in a rubbery state of the cured article described hereinafter and the shape retention tends to be lowered.

It is known that the value of storage modulus in torsion in a rubbery state of the cured article has a correlation relationship with the crosslinked density of the cured article. In the radiation curable resin composition for a Fresnel lens of the present invention, when the storage modulus in torsion in this rubbery state is represented as a storage modulus in torsion [E' (Tmax+40° C.)] at a temperature which is 40° C. higher than the [T (max)], the value of [E' (Tmax+40° C.)] is preferably within a range from $5.0 \times 10^6$ to $2.0 \times 10^7$ Pa so as to prevent deformation caused by an external force applied to the cured article having a fine shape because of too low crosslinkage density, and to prevent chipping and cracks caused by an external force applied to the cured article having a fine shape because of too high crosslinkage density.

More preferably, [T (max)] as determined in the measurement of a dynamic viscoelasticity under the same conditions as in the case of the radiation curable resin composition for a Fresnel lens of the present invention is within a range from 55 to 80° C., [Tanδ (max)] is within a range from 0.7 to 1.5, [ΔT(0.1)] is within a range from 30 to 55° C., and E' (Tmax+40° C.)] is within a range from $1.0 \times 10^7$ to $2.0 \times 10^7$ Pa.

In the measurement of the dynamic viscoelasticity, since the dynamic viscoelasticity is likely to be influenced by the thickness of the sample film, the measured value of the dynamic viscoelasticity described in the present invention was defined as a value determined from data obtained at a temperature in a range from −30° C to 120° C. among data obtained by measuring under the conditions at a frequency of 1 Hz, strain of 0.05% and rate of 3° C./min between −50° C. and 150° C. using a tensile-strain-controlled instrument (Rheometrics RSA-II) and a film having a thickness of 200±25 μm and a size of 6×35 mm.

In the radiation curable resin composition for a Fresnel lens of the present invention, various synthetic resins can be used in combination, in addition to the components (a) to (d), in order to improve the viscosity and the adhesion to the plastic substrate.

Typical examples of the synthetic resin, which can be used in the present invention, include (meth)acrylic resin such as methyl methacrylate resin or methyl methacrylate copolymer; polystyrene resin such as polystyrene, methyl methacrylate styrene copolymer; polyester resin such as saturated or unsaturated polyester resin having a bisphenol structure; polybutadiene resin such as polybutadiene or butadiene-acrylonitrile copolymer; and epoxy resin such as phenoxy resin or novolak type epoxy resin.

The synthetic resin is preferably mixed in an amount within a range from 1 to 30 parts by weight based on 100 parts by weight of the total amount of the radiation curable resin composition for a Fresnel lens of the present invention.

If necessary, the other unsaturated double bond-containing compound can be used as an optional component in the radiation curable resin composition for a Fresnel lens of the present invention, in addition to the components (a) to (d) described above, for the purpose of finely controlling the viscosity and refractive index.

Typical examples of the other unsaturated double bond-containing compound, which can be used in the present invention, include (meth)acrylate having an alkyl group having 1 to 22 carbon atoms, such as methyl (meth)acrylate, ethyl (meth)acrylate, propyl (meth)acrylate, n-butyl (meth) acrylate, i-butyl (meth)acrylate, t-butyl (meth)acrylate, octyl (meth)acrylate, dodecyl (meth)acrylate, or stearyl (meth) acrylate; (meth)acrylate having a hydroxyalkyl group such as hydroxyethyl(meth)acrylate, hydroxypropyl(meth) acrylate or glycerol (meth)acrylate, lactone-modified hydroxyethyl (meth)acrylate, or (meth)acrylate having a polyalkylene glycol group such as polyethylene glycol or polypropylene glycol; phosphoethyl (meth)acrylate; styrene compound such as styrene, α-methylstyrene or chlorostyrene; N,N-dialkylaminoalkyl (meth)acrylate such as N,N-dimethylaminoethyl (meth)acrylate, N,N-diethylaminoethyl (meth)acrylate or N,N-diethylaminopropyl (meth)acrylate; N-vinyl pyrrolidone, N-vinyl caprolactone, or acryloylmorpholine; (poly)ethylene glycol di(meth)acrylate such as ethylene glycol di(meth)acrylate, diethylene glycol di(meth)acrylate, triethylene glycol di(meth)acrylate, tetraethylene glycol di(meth)acrylate or heptaethylene glycol di(meth)acrylate; di(meth)acrylate such as 1,3-butylene glycol di(meth)acrylate, 1,4-butylene glycol di(meth)acrylate, 1,6-hexamethylene glycol di(meth)acrylate, 1,9-nonanediol di(meth)acrylate, neopentyl glycol di(meth)acrylate, hydroxypivalic acid neopentyl glycol di(meth)acrylate, di(meth)acrylate of a compound prepared by adding caprolactone to hydroxypivalic acid neopentyl glycol, or neopentyl glycol adipate di(meth)acrylate; compound obtained by ester bonding of three or more molecules of (meth)acrylic acid to a compound having three or more hydroxyl groups, such as trimethylolpropane, ditrimethylolpropane, pentaerythritol, dipentaerythritol, tetramethylolmethane, or hydroxyl group-containing compound obtained by adding 1 to 20 mol of alkylene oxide other than oxypropylene; compound obtained by ester bonding of two molecules of (meth)acrylic acid to a compound such as ethylene oxide adduct of bisphenol A and halide thereof, propylene oxide adduct of bisphenol A and halide thereof, ethylene oxide adduct of bisphenol F and halide thereof, propylene oxide adduct of bisphenol F and halide thereof, ethylene oxide adduct of bisphenol S and halide thereof, propylene oxide adduct of bisphenol S and halide thereof, 2,2'-di (hydroxypropoxyphenyl)propane and halide thereof, 2,2'-di (hydroxyethoxyphenyl)propane and halide thereof; an alicyclic compound having two hydroxyl groups such as tricyclodecanedimethylol; sulfur-containing compound such as bis[4-(meth)acryloyloxyphenyl]-sulfide, bis[4-(meth) acryloyloxyethoxyphenyl]-sulfide, bis[4-(meth) acryloyloxypentaethoxyphenyl]-sulfide, bis[4-(meth) acryloyloxyethoxy-3-phenylphenyl]-sulfide, bis[4-(meth) acryloyloxyethoxy-3,5-dimethylphenyl]-sulfide, bis(4-(meth)acryloyloxyrthoxyphenyl)sulfone; and polyfunctional (meth)acrylate such as di[(meth) acryloyloxyethoxy)phosphate or tri[(meth) acryloyloxyethoxy]phosphate.

A preferable radiation curable composition for a Fresnel lens of the present invention, which is composed of the respective components described above, can produce a cured article having a high refractive index of 1.55 or more. When the refractive index of the Fresnel lens layer is less than 1.55, it becomes difficult to form a Fresnel lens sheet having a thin lens shape, and there arises a problem of the releasability from the mold. More preferably, the refractive index of the cured article is preferably within a range from 1.55 to 1.60.

In that case, the refractive index of the resin composition is preferably 1.52 or more. Consequently, a cured article obtained by curing the resin composition having a high refractive index of 1.55 or more can be obtained.

The viscosity of the radiation curable resin composition for a Fresnel lens of the present invention is preferably within a range from 1000 to 30000 mPa·s, and more preferably from 1000 to 20000 mPa·s, at 25° C. in order to uniformly coat the resin composition to a matrix and to duplicate a mold having a fine structure. Even if the viscosity is not within the above range, the viscosity can be adjusted by controlling the temperature of the resin composition.

In the present invention, radiation is used in the curing reaction. In the case in which the resin composition of the present invention is cured by using visible light or ultraviolet light, photo(polymerization) initiators capable of generating a radical by irradiation with ultraviolet light or visible light should be used.

Typical examples of the photopolymerization initiator used in the present invention include benzophenone derivatives such as benzophenone, 3,3'-dimethyl-4-methoxybenzophenone, 4,4'-bisdimethylaminobenzophenone, 4,4'-bisdiethylaminobenzophenone, 4,4'-dichlorobenzophenone, Michler's ketone and 3,3',4,4'-tetra(t-butylperoxycarbonyl) benzophenone; xanthone derivatives and thioxanthone derivatives, such as xanthone, thioxanthone, 2-methylthioxanthone, 2-chlorothioxanthone and 2,4-diethylthioxanthone; acloin ethers such as benzoin, benzoin methyl ether, benzoin ethyl ether and benzoin isopropyl ether; α-diketones such as benzyl and diacetyl; sulfides such as tetramethylthiuram disulfide and p-tolyl disulfide; benzoic acids such as 4-dimethylaminobenzoic acid and ethyl 4-dimethylaminobenzoate.

The photopolymerization initiator also includes 3,3'-carbonyl-bis(7-diethylamino)coumarin, 1-hydroxycyclohexyl phenyl ketone, 2,2'-dimethoxy-1,2-diphenylethan-1-one, 2-methy-1-[4-(methylthio)phenyl]-2-morpholinopropan-1-one, 2-benzyl-2-dimethylamino-1-(4-morpholinophenyl)-butan-1-one, 2-hydroxy-2-methyl-1-phenylpropan-1-one, 2,4,6-trimethylbenzoyldiphenylphosphine oxide, bis(2,4,6-trimethylbenzoyl)phenylphosphine oxide, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 4-benzoyl-4'-methyldimethyl sulfide, 2,2'-diethoxyacetophenone, benzyl dimethyl ketal, benzyl-β-methoxyethylacetal, methyl o-benzoylbenzoate, bis(4-dimethylaminophenyl)ketone, p-dimethylaminoacetophenone, α,α-dichloro-4-phenoxyacetophenone, pentyl-4-dimethylamino benzoate, 2-(o-chlorophenyl)-4,5-diphenylimidazolyl dimer, 2,4-bis-trichloromethyl-6-[di-(ethoxycarbonylmethyl)amino] phenyl-S-triazine, 2,4-bis-trichloromethyl-6-(4-ethoxy) phenyl-S-triazine, 2,4-bis-trichloromethyl-6-(3-bromo-4-ethoxy)phenyl-S-triazineanthraquinone, 2-t-butylanthraquinone, 2-amylanthraquinone and β-chloroanthraquinone.

As the photo(polymerization)initiator, for example, there can be used commercially available products such as Irgacure-184, Irgacure-149, Irgacure-261, Irgacure-369, Irgacure-500, Irgacure-651, Irgacure-784, Irgacure-819, Irgacure-907, Irgacure-1116, Irgacure-1664, Irgacure-1700, Irgacure-1800, Irgacure-1850, Irgacure-2959, Irgacure-4043, Darocur-1173 (CIBA SPECIALITY CHEMICALS INC.), LUCILIN TPO (BASF CO.), KAYACURE-DETX, KAYACURE-MBP, KAYACURE-DMBI, KAYACURE-EPA, KAYACURE-OA (NIPPON KAYAKU CO., LTD.), VICURE-10 and VICURE-55 (STAUFFER CO., LTD.), TRIGONALP1 (AKZO CO., LTD.), SANDORY 1000 (SANDOZ CO., LTD.), DEAP (APJOHN CO., LTD.), QUANTACURE-PDO, QUANTACURE-ITX and QUANTACURE-EPD (WARD BLEKINSOP CO., LTD.).

Also these photopolymerization initiators can be used in combination with conventionally known photosensitizers. Typical examples of the photosensitizer, which can be used in the present invention, include amines, ureas, sulfur-containing compounds, phosphorus-containing compounds, chlorine-containing compounds, nitrites and other nitrogen-containing compounds.

These photosensitizers can be used alone or in combination. The amount is not specifically limited, but is preferably within a range from 0.05 to 20 parts by weight, and more preferably from 0.1 to 10 parts by weight, based on 100 parts by weight of the total amount of the radiation curable resin composition for a Fresnel lens of the present invention so as to prevent lowering of the sensitivity, deposition of crystals, and deterioration of physical properties of the coating film.

Among these photosensitizers, particularly preferred is a mixture of one or more kinds selected from the group consisting of 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, thioxanthone and thioxanthone derivative, 2,2'-dimethoxy-1,2-diphenylethan-1-one, 2,4,6-trimethylbenzoyldiphenylphosphine oxide, bis(2,4,6-trimethylbenzoyl)phenylphosphine oxide, 2-methyl-1-[4-(methylthio)phenyl]-2-morpholinol-propanone and 2-benzyl-2-dimethylamino-1-(4-morpholinophenyl)-butan-1-one because high curability can be obtained.

In the production of the Fresnel lens sheet using the radiation curable resin composition for a Fresnel lens of the present invention, the resin composition is generally irradiated with radiation such as ultraviolet light through a transparent substrate as a support. In that case, the usable photoinitiator is preferably an initiator having light absorption characteristics at a long wavelength range, and more preferably an initiator which enables radiation to exert a light initiation ability at a wavelength within a range from 300 to 450 nm. When using the initiator having a strong light absorption ability to light having a wavelength of more than 450 nm, the composition is poor in stability and the production must be carried out in a completely light-shielded atmosphere and, therefore, it becomes very difficult to handle the composition. When using electron beam, neither photoinitiator nor photosensitizers are required.

As a matter of course, the radiation curable resin composition is superior in transparency. In a cured article having a thickness of 200±25 $\mu$m, transmittance of light having a wavelength within a range from 400 to 900 nm is at least 80%, preferably 85% or more, and more preferably 90% or more.

If necessary, various additives such as ultraviolet light absorbers, antioxidants, silicone additives, rheology controlling agents, defoamers, releasants, electrostatic agents, antifogging agents and colorants can also be added in the resin composition in order to improve the quality of the coating film, coatability and releasability from the mold.

Typical examples of the ultraviolet light absorber, which is used in the present invention, include triazine derivative such as 2-[4-{(2-hydroxy-3-dodecyloxypropyl)oxy}-2-hydroxyphenyl]-4,6-bis(2,4-dimethylphenyl)-1,3,5-triazine or 2-[4-{(2-hydroxy-3-tridecyloxypropyl)oxy}-2-hydroxyphenyl]-4,6-bis(2,4-dimethylphenyl)-1,3,5-triazine, 2-(2'xanthenecarboxy-5'-methylphenyl)benzotriazole, 2-(2'-o-nitrobenzyl oxy-5'-methylphenyl)benzotriazole, 2-xanthenecarboxy-4-dodecyloxybenzophenone, and 2-o-nitrobenzyl oxy-4-dodecyloxybenzophenone.

Typical examples of the silicone additive the present invention, which is used in the present invention, include polyorganosiloxanes having an alkyl group or a phenyl group include dimethylpolysiloxane, methylphenylpolysiloxane, cyclic dimethylpolysiloxane, methylhydrogenpolysiloxane, polyether-modified dimethylpolysiloxane copolymer, ester-modified dimethylpolysiloxane copolymer, fluorine-modified dimethylpolysiloxane copolymer and amino-modified dimethylpolysiloxane copolymer.

The amount of various additives described above is usually within a range from 0.01 to 5 parts by weight based on 100 parts by weight of the radiation curable resin composition for a Fresnel lens of the present invention because the effect is sufficiently exerted and ultraviolet curing is not prevented.

The radiation curable resin composition for a Fresnel lens of the present invention is a material suitable for use in various Fresnel lens sheets having a structure in which a Fresnel lens layer having a fine lens pattern made of a cured resin article is provided on a plate- or sheet-shaped transparent substrate.

A cross-sectional view showing a screen using a Fresnel lens sheet of the present invention is shown in FIG. 1.

A screen lens 1 shown in FIG. 1 comprises a Fresnel lens sheet 2 and a lenticular lens sheet 3. The Fresnel lens sheet 2 comprises a Fresnel lens layer 4 obtained by curing the radiation curable resin composition for a Fresnel lens of the present invention on a plastic substrate 5.

As the plate- or sheet-shaped plastic substrate, for example, (meth)acrylic resin containing methyl methacrylate as a main component, a polystyrene resin and a polycarbonate resin can be used. The (meth)acrylic resin containing methyl methacrylate as a main component is particularly preferably used because of good adhesion between the radiation curable resin composition for a Fresnel lens of the present invention and the substrate.

The screen 1 can also be used in combination with a lens sheet having the other shape, in addition to the lenticular lens sheet 3 shown in FIG. 1.

The Fresnel lens sheet 2 is produced by using the radiation curable resin composition for a Fresnel lens of the present invention, filling the resin composition into a mold having a Fresnel lens shape, laying a plastic substrate on the filled resin under pressure without causing contamination with air, irradiating the resin composition with radiation such as ultraviolet light from the side of the plastic substrate, thereby curing the resin composition, and removing the cured article from the mold.

The Fresnel lens sheet of the present invention is a Fresnel lens sheet which exhibits a high elastic modulus and a high refractive index, wherein the Fresnel lens layer is superior in adhesion to the plastic substrate and transparency and also the Fresnel lens layer exhibits excellent shape retention over a wide temperature range and is less likely to chip and crack due to an outer force because the Fresnel lens surface is formed by using the radiation curable resin composition for a Fresnel lens of the present invention. Therefore, when a screen is made using the cured article, the resistance to the contact pressure with a lenticular lens and the resistance to the pressure due to an assembly after TV unit setting are improved, thus simplifying the design with resect to handling during screen setting, for example, operability and assembly. Also it is possible to cope with the design of a lens having a shorter focus because of a high refractive index.

EXAMPLES

The following Examples and Comparative Examples further illustrate the present invention in more detail, but the present invention is not limited thereto. In the Examples, parts and percentage are by weight unless otherwise specified.

(Examples 1 to 4 and Comparative Examples 1 to 5)

According to the formulation shown in Table 1, a radiation curable resin composition for a Fresnel lens was prepared.

A cured article and Fresnel lens sheet for measurement was made by the following procedure.

(1) Cured resin film: A cured resin film A having a smooth surface and a thickness of 200±25 $\mu$m was made by interposing the resulting radiation curable resin composition for a Fresnel lens between a chrome-plated metal plate and a transparent surface-untreated PET film, controlling the thickness of the resin composition, irradiating the resin composition with ultraviolet light at a dose of 800 mJ/cm$^2$ from the side of the transparent substrate using a high pressure mercury lamp, thereby curing the resin composition, and peeling the radiation cured resin layer from the metal plate and the transparent substrate. Also, a cured resin film B having a smooth surface and a thickness of 160±25 $\mu$m was made by applying the resulting radiation curable resin composition for a Fresnel lens onto the surface of a glass plate using an applicator, irradiating the resin composition with ultraviolet light at a dose of 800 mJ/cm$^2$ using a high pressure mercury lamp, thereby curing the resin composition, and peeling the radiation cured resin layer from the glass plate.

(2) Substrate with cured resin layer: A substrate C with a cured resin layer having a smooth surface and a thickness of 150±25 μm was made by interposing the resulting radiation curable resin composition for a Fresnel lens between a chrome-plated metal plate and a substrate (10 cm in length, 10 cm in width and 2 mm in thickness) made of methyl methacrylate resin (Sumipex HT, Sumitomo Chemical Co., Ltd.), controlling the thickness of the resin composition, irradiating the resin composition with ultraviolet light at a dose of 800 mJ/cm$^2$ from the side of the transparent substrate using a high pressure mercury lamp, thereby curing the resin composition, and peeling the transparent substrate and radiation cured resin layer from the metal plate.

(3) Fresnel lens sheet: A Fresnel lens sheet D was made by filling the resulting radiation curable resin composition for a Fresnel lens into a chrome-plated Fresnel lens mold using a dispenser, laying a plate-shaped substrate (2 mm in thickness) made of methyl methacrylate resin (Sumipex HT, Sumitomo Chemical Co., Ltd.) on the resin composition under pressure without causing contamination with air, irradiating the resin composition with ultraviolet light at a dose of 1500 mJ/cm$^2$ using a high pressure mercury lamp, thereby curing the resin composition, and removing the cured article from the mold.

(Procedures for Evaluation)

Using these radiation curable resin compositions for a Fresnel lens, and cured articles and Fresnel lens sheets for measurement, evaluations were carried out in accordance with the following procedures for measurement and test.

The evaluation results are shown in Table 1, Table 2(1) and Table 2(2).

(1) Measurement of viscosity: Using an E-type rotational viscometer, the viscosity (mPa·s) of the resin composition prepared according to the formulation shown in Table 1 was measured at 25° C.

(2) Refractive index: A liquid sample and a cured sample were measured.

The liquid sample was directly applied to the surface of a prism of an Abbe's refractometer and the liquid refractive index was measured at 25° C. Using a cured resin film A as the cured sample and using 1-bromonaphthalene as an intermediate liquid for making the sample and the prism come closely into contact, the cured article refractive index was measured at the sample temperature of 25° C. by the Abbe's refractometer.

(3) Tensile elastic modulus: The curable resin film B was cut into pieces of 1 cm in width and 10 cm in length using a cutter knife to form samples for measurement, and then the measurement was carried out at a distance between marked lines of 40 mm. Using a testing machine UTM-4-100 (Orientec), the measurement was carried out at a rate of strain of 10.0 mm/min in an atmosphere of 23±1° C. and a relative humidity of 50±5%. The measurement was carried out 5 times and an average value was taken as evaluation results. The tensile elastic modulus was calculated from the slope of the tangent to the S-S curve (stress-strain curve) from the start point of tensile strain.

(4) Measurement of dynamic viscoelasticity: Using a tensile-strain-controlled instrument (Rheometrics RSA-II), the curable resin film A as a sample in size of 6×35 mm was subjected to the measurement under the conditions at a frequency of 1 Hz, strain of 0.05% and rate of 3° C./min between −50° C. and 150° C. [T (max)], [Tan δ (max)], [ΔT (0.1)] and [E' (Tmax+40° C.)] were determined from data obtained by measuring at a temperature within a range from −30° C. to 120° C. among the resulting data.

(5) Transparency: Using the curable resin film B, the transmittance of light having a wavelength within a range from 400 to 900 nm was measured. Samples where the transmittance is 85% or more within entire range were rated "Good (○)", while samples where the transmittance is less than 85% were rated "Poor (X)".

(6) Adhesion: Using the substrate C with a cured resin layer, the adhesion between the transparent substrate and the cured resin layer was evaluated in accordance with JIS K5400. Samples where entire squares remained were rated "Good (○)", while others were rated "Poor (X)".

(7) Judgment of appearance: The appearance of the Fresnel lens sheet D was visually observed. Samples having uniform surfaces were rated "Good (○)", while samples with cracks and chipping were rated "Poor (X)".

(8) Shape retention: On a smooth metal plate, each test piece having a size of 10 cm×10 cm obtained by cutting from the edge portion of the Fresnel lens sheet D was horizontally placed while turning the side of the cured resin layer up. After placing a weight with a flat bottom on the center portion, a load of 20 g/cm$^2$ was applied at 40° C. for 60 minutes. After removing the load, it was visually observed whether or not a deformation mark of the Fresnel lens sheet D was formed. Samples where a deformation mark was not observed were rated "Good (○)", while samples where a deformation mark was observed were rated "Poor (X)".

(9) Cuttability: Using a precision hand cutter (Sankyo Co., Ltd. KPS3002), the substrate C with a cured resin layer was cut by putting the edge on the side of the cured resin layer. Samples where no damage of the cured resin layer or the transparent substrate occurred were rated "Good (○)", while samples where chipping or cracks occurred were rated "Poor (X)".

TABLE 1

|  |  | Examples | | | | Comparative Examples | | | |
|---|---|---|---|---|---|---|---|---|---|
|  |  | 1 | 2 | 3 | 4 | 1 | 2 | 3 | 4 |
| (a) | a-1 | 50 | 42 | 43 | 40 | 50 | — | 40 | 40 |
|  | a-2 | — | — | — | — | — | 40 | — | — |
| (b) | b-1 | 5 | 5 | 10 | 15 | — | 15 | 15 | 15 |
| (c) | c-1 | 25 | 22 | 23 | 12 | 26 | 21 | — | — |
|  | c-2 | — | 7 | — | — | — | — | — | — |
|  | c-3 | — | — | — | 9 | — | — | — | — |
|  | c-4 | — | — | — | — | — | — | 21 | — |
|  | c-5 | — | — | — | — | — | — | — | 21 |

TABLE 1-continued

|  | Examples | | | | Comparative Examples | | | |
|---|---|---|---|---|---|---|---|---|
|  | 1 | 2 | 3 | 4 | 1 | 2 | 3 | 4 |
| (d) d-1 | 18 | 11 | 22 | 22 | 22 | 22 | 22 | 22 |
| d-2 | — | 11 | — | — | — | — | — | — |
| Photoinitiator | 2 | 2 | 2 | 2 | 2 | 2 | 2 | 2 |
| Viscosity (mPa · S) | 9500 | 12500 | 8500 | 10000 | 11000 | 950 | 13500 | 6200 |
| Liquid refractive index | 1.531 | 1.532 | 1.530 | 1.529 | 1.534 | 1.518 | 1.529 | 1.533 |

Notes for Table 1
(a-1) Epoxy acrylate prepared by reacting a bisphenol A type epoxy resin (epoxy equivalent per weight: 635 g/eq) with acrylic acid
(a-2) Epoxy acrylate prepared by reacting a bisphenol A type epoxy resin (epoxy equivalent per weight: 188 g/eq) with acrylic acid
(b-1) Triacrylate of tris(2-hydroxyethyl)isocyanuric acid
(c-1) Tripropylene glycol diacrylate (molecular weight: about 300)
(c-2) Triacrylate (molecular weight: about 470) of polyhydric alcohol, prepared by addition reaction of about 3 mol of oxypropylene to trimethylolpropane
(c-3) Polypropylene glycol diacrylate (average repeating unit of propylene glycol: n = 7) (molecular weight: about 530)
(c-4) Polypropylene glycol diacrylate (average repeating unit of propylene glycol: n = 12) (molecular weight: about 820)
(c-5) Polyethylene glycol diacrylate (average repeating unit of ethylene glycol: n = 4) (molecular weight: about 300)
(d-1) Phenoxyethyl acrylate
(d-2) 2-phenyl-2-(4-acryloyloxyethoxyphenyl)propane
(Photoinitiator): 1-hydroxycyclohexyl phenyl ketone

TABLE 2 (1)

|  | Examples | | | |
|---|---|---|---|---|
|  | 1 | 2 | 3 | 4 |
| Cured article refractive index | 1.554 | 1.554 | 1.553 | 1.554 |
| Tensile elasticity (MPa) | 1606 | 1543 | 1562 | 1478 |
| Dynamic viscoelasticity T(max) (° C.) | 57 | 59 | 59 | 58 |
| Tan δ (max) | 1.16 | 0.90 | 1.01 | 0.93 |
| ΔT (0.1) (° C.) | 42 | 43 | 37 | 38 |
| E' (Tmax + 40° C.) (×10$^7$ Pa) | 1.27 | 1.91 | 1.18 | 1.54 |
| Transparency | ○ | ○ | ○ | ○ |
| Adhesion | ○ | ○ | ○ | ○ |
| Appearance | ○ | ○ | ○ | ○ |
| Shape retention | ○ | ○ | ○ | ○ |
| Cuttability | ○ | ○ | ○ | ○ |

TABLE 2 (2)

|  | Comparative Examples | | | |
|---|---|---|---|---|
|  | 1 | 2 | 3 | 4 |
| Cured article refractive index | 1.553 | 1.547 | 1.549 | 1.557 |
| Tensile elasticity (MPa) | 1501 | 1562 | 724 | 1549 |
| Dynamic viscoelasticity T(max) (° C.) | 54 | 81 | 50 | 65 |
| Tan δ (max) | 1.08 | 0.43 | 0.65 | 0.71 |
| ΔT (0.1) (° C.) | 42 | 58 | 64 | 43 |
| E' (Tmax + 40° C.) (×10$^7$ Pa) | 1.14 | 5.23 | 1.45 | 2.06 |
| Transparency | ○ | ○ | ○ | ○ |
| Adhesion | ○ | ○ | ○ | X |
| Appearance | ○ | X | ○ | ○ |
| Shape retention | X | ○ | X | ○ |
| Cuttability | ○ | X | ○ | ○ |

As is apparent from Table 2(1) and Table 2(2), all cured articles obtained from the radiation curable resin composition for a Fresnel lens of the present invention exhibited excellent adhesion to the substrate and excellent shape retention and neither chipping nor cracks occurred due to an external force. The cured article exhibits poor shape retention in Comparative Example 1 using no trifunctional (meth) acrylate (b), the cured article exhibits poor appearance and poor cuttability in Comparative Example 2 using a compound having an epoxy equivalent per weight of less than 450 g/eq in place of the epoxy (meth)acrylate (a), the cured article exhibits poor shape retention in Comparative Example 3 using a (meth)acrylate having a molecular weight of more than 700 as the (meth)acrylate having an oxypropylene structure, and the cured article is inferior in adhesion to the substrate in Comparative Example 4 using polyethylene glycol diacrylate in place of the (meth)acrylate (c) having an oxypropylene structure.

What is claimed is:

1. A radiation curable resin composition for a Fresnel lens comprising, an epoxy (meth)acrylate (a) having two or more (meth)acryloyl groups obtained by reacting an epoxy resin having a cyclic structure and an epoxy equivalent per weight of 450 g/eq or more with (meth)acrylic acid; a trifunctional (meth)acrylate (b) represented by general formula (1); a (meth)acrylate (c) which is a (meth)acrylate of an aliphatic polyhydric alcohol having an oxypropylene structure and two or more hydroxyl groups and has a molecular weight of 700 or less; and a monofunctional (meth)acrylate (d) having a cyclic structure; said general formula 1:

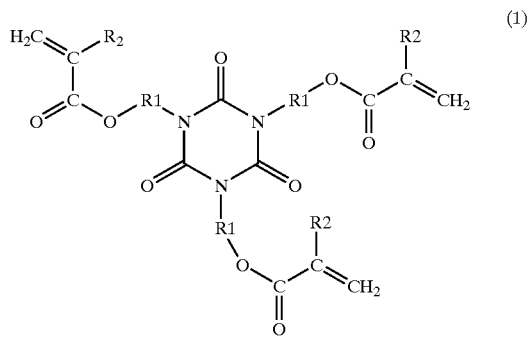

(1)

wherein R1 represents a hydrocarbon group having 1 to 5 carbon atoms and R2 represents hydrogen or a methyl group.

2. The radiation curable resin composition for Fresnel lens according to claim 1, wherein the molecular weight of the (meth)acrylate (c) is from 180 to 450.

3. The radiation curable resin composition for a Fresnel lens according to claim 1, which contains 30 to 70 parts by weight of the epoxy (meth)acrylate (a), 1 to 20 parts by weight of the trifunctional (meth)acrylate (b) represented by the general formula (1), 5 to 40 parts by weight of the (meth)acrylate (c) and 5 to 35 parts by weight of the monofunctional (meth)acrylate (d), each amount being based on 100 parts by weight of the total amount of these components.

4. The radiation curable resin composition for a Fresnel lens according to claim 1, 2 or 3, wherein said monofunctional (meth)acrylate (d) having a cyclic structure includes an aromatic ring.

5. A Fresnel lens sheet comprising a substrate made of a (meth)acrylic resin comprising methyl methacrylate as a main component, a polystyrene resin or a polycarbonate resin, and a resin layer made of a cured article of the radiation curable resin composition for a Fresnel lens of claim 1, 2, 3 or 4, which is formed on the surface of the substrate in the form of a Fresnel lens.

* * * * *